March 18, 1958

D. B. HAAGENSEN 2,827,537

ELECTRONIC HEATING APPARATUS

Filed Nov. 12, 1953

INVENTOR
DUANE B. HAAGENSEN
BY Elmer J. Gorn
ATTORNEY

March 18, 1958     D. B. HAAGENSEN     2,827,537
ELECTRONIC HEATING APPARATUS

Filed Nov. 12, 1953     3 Sheets-Sheet 2

INVENTOR
DUANE B. HAAGENSEN
BY
ATTORNEY

March 18, 1958 D. B. HAAGENSEN 2,827,537
ELECTRONIC HEATING APPARATUS
Filed Nov. 12, 1953 3 Sheets-Sheet 3

INVENTOR
DUANE B. HAAGENSEN
BY
ATTORNEY

United States Patent Office 2,827,537
Patented Mar. 18, 1958

2,827,537

ELECTRONIC HEATING APPARATUS

Duane B. Haagensen, Wayland, Mass., assignor to Raytheon Manufacturing Company, Waltham, Mass., a corporation of Delaware Application November 12, 1953, Serial No. 391,553

13 Claims. (Cl. 219—10.55)

This application relates to an electronic heating apparatus and more particularly to an apparatus utilizing radiated high frequency for heating food bodies.

In my patent application, Serial No. 345,372, filed March 30, 1953, copending jointly with Henry F. Argento, there is disclosed an apparatus for heating food bodies with provision to allow the radiated energy to be coupled out of the heating chamber in the absence of a body to be heated positioned in the chamber. This application discloses several improvements and modifications over said copending application.

Specifically, this invention discloses that the efficiency with which the radiated energy is coupled into the body to be heated can be materially improved by introducing said energy into the region of the body to be heated at a point directly below said body. The support for the food body, which may include the food body container, may then be constructed to act as an impedance matching device for improving the coupling of the radiated energy into the food body.

This invention further discloses that the radiated energy may be directed uniformly into the bottom of the heating cavity throughout the entire area thereof, for example, by means of a horn. The floor of the oven may then be made of a dielectric material transparent to the radiant energy but having a characteristic impedance substantially different from that of the horn. The thickness of the dielectric floor is then made such that it presents a substantial impedance discontinuity to the horn at any particular point thereof. However, when a food body container, having a dielectric bottom of suitable thickness, is placed on the dielectric oven floor, the combined thicknesses of the floor and the container are such that a good impedance match between the horn and the food body occurs at this point, with the result that the floor of the oven appears to be an impedance discontinuity with a coupling iris therein in the area where the food body container is placed on the oven floor. As a result, a large part of the radiated energy is transferred directly from the horn into the food body without being reflected from the sides of the cooker cavity. Accordingly, only a small portion of the energy is reflected back toward the source of radiant energy, thereby producing a relatively low standing wave ratio at the source of radiated energy.

This invention further discloses that the source of radiated energy may be protected from damage in the absence of a body to be heated in the cavity by means of a coupling aperture in the top of the cooker cavity which couples out energy passing with low intensity through the large surface of the oven floor, and, hence, prevents sufficient reflection to the source of radiated energy, for example a magnetron oscillator, to prevent damage thereto by overheating or mode shifting.

This invention further discloses a structure for cyclically varying the mode intensity pattern in the cooker cavity whereby localized hot spots, in the body being heated, are eliminated. Briefly, this structure comprises a reflecting member rotating about an axis lying substantially parallel to the floor of the oven, said reflecting member comprising a planar member asymmetrically mounted on an insulating rod rotating about said axis with the larger portion of the planar member having an iris type coupling slot therein which substantially reduces undesirable variation in the standard wave ratio during mode stirring. The coupling aperture in the top of the oven is dimensioned and arranged to couple energy throughout any of the mode changes produced by the mode stirring.

This invention further discloses that certain new and unobvious advantages have been discovered in the use of an insulating surface on the surfaces of the oven. Specifically, arcing and sparking, which occurred close to the metal surfaces in previous high frequency cooking devices, have been substantially eliminated. This invention further discloses a particular door structure found useful with the cooking oven disclosed herein.

This invention further discloses that, by utilizing a translucent food container with a transparent top, a light may be shone into the oven through a grill having openings therein less than a half-wave length of the radiant energy in the oven, whereby the contents of the dish are illuminated and may be viewed from the outside of the oven through a suitable grill, for example, in a door of the oven.

Other and further objects and advantages of this invention will be apparent as the description thereof progresses, reference being had to the accompanying drawings, wherein.

Figure 1:
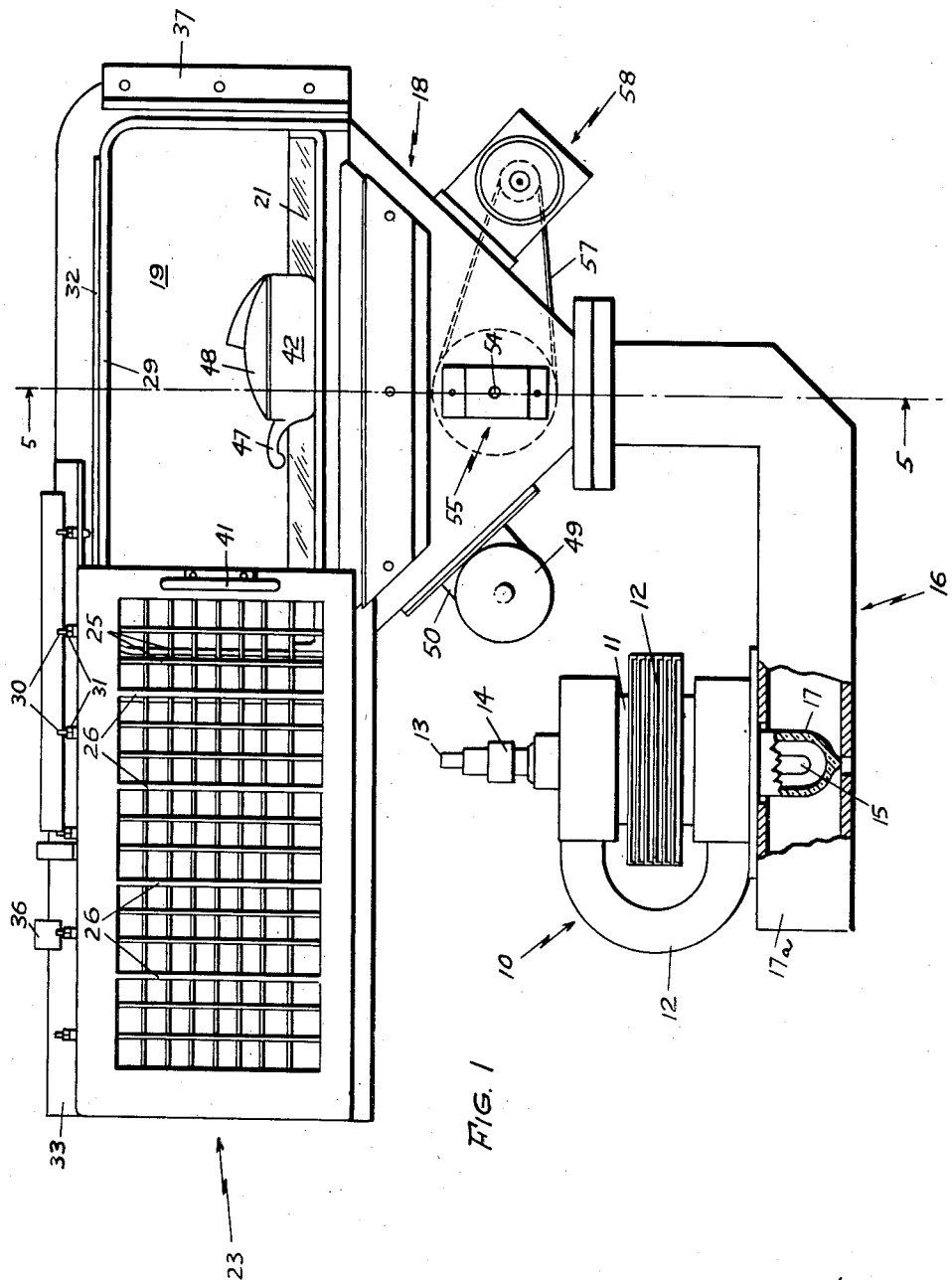
Fig. 1 illustrates a front elevation view of an electronic cooker with its door open embodying principles and discoveries of this invention.
Figure 2:
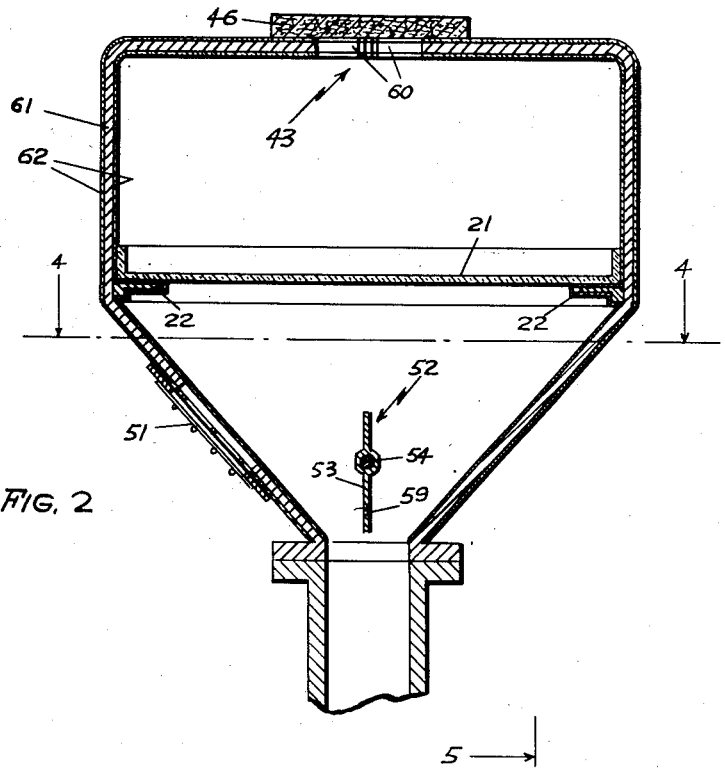
Fig. 2 illustrates a longitudinal cross-sectional view of the oven portion of the structure illustrated in Fig. 1.
Figure 3:
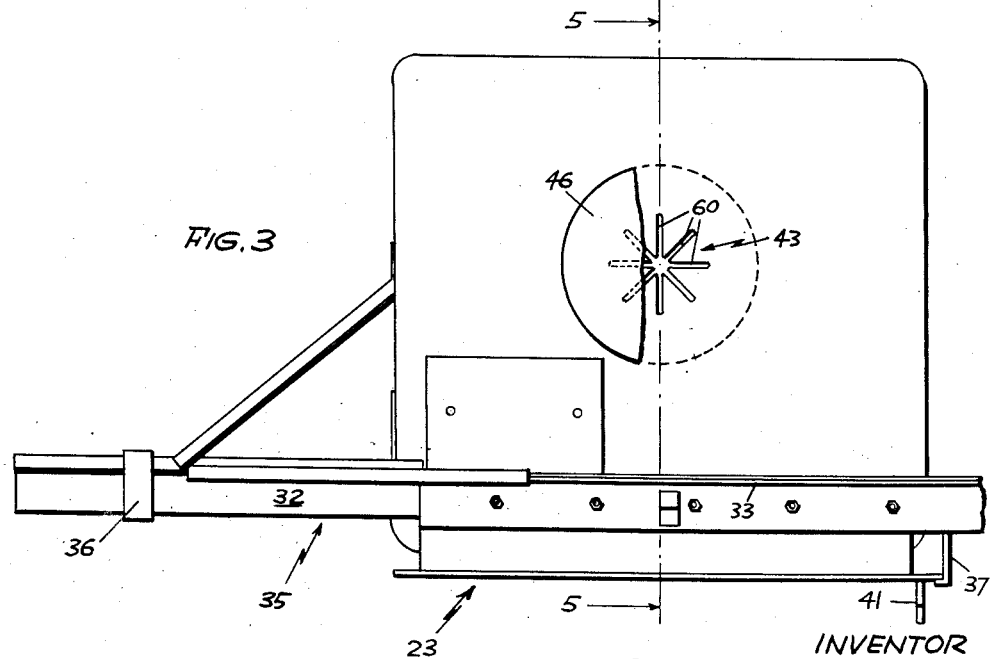
Fig. 3 illustrates a top plan view of the oven portion of the structure illustrated in Fig. 1 showing details of the coupling iris in the top of the oven and the door support structure with the door closed.
Figure 4:
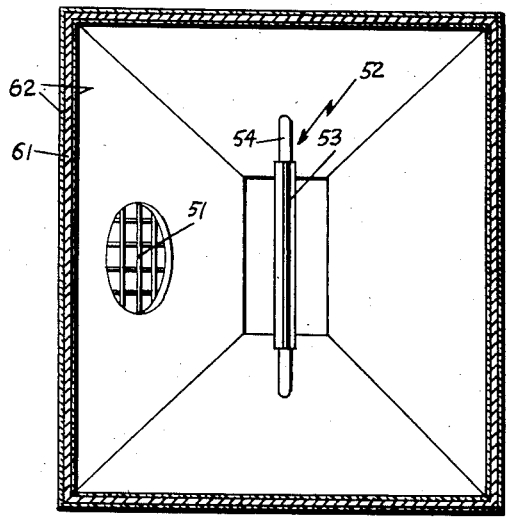
Fig. 4 illustrates a transverse cross-sectional view of the horn showing details of the mode stirrer structure.

Referring now to Fig. 1 of the drawings, there is shown a source of microwave energy 10 illustrated herein as a conventional magnetron oscillator having an anode structure 11 cooled by air blowing past fins 12. Suitable input voltages are applied to the filament electrode 13 and cathode electrode 14 to produce microwave oscillations inside the anode structure 11, under the influence of a magnetic field produced transverse to the direction of the electron motion by means of a permanent magnet 12, in accordance with well-known practice.

The output of magnetron 10 is coupled by means of a radiating probe 15 into a wave guide 16. Probe 15, as shown here, is surrounded by a ceramic envelope 17 inside wave guide 16, envelope 17 being part of the vacuum envelope structure of magnetron 10, whereby the region immediately adjacent probe 15 is free from gas, thereby eliminating any danger of a gaseous breakdown or ionization in this region. The field intensity decreases rapidly with distance away from probe 15 such that the field intensity outside envelope 17 in the wave guide 16 is below the level required for ionization of the air in the wave guide 16.

One end of the wave guide 16 is blocked by a shorting plug, as at 17a, the distance of the shorting plug 17a from the probe 15 being adjusted to substantially match the characteristic impedance of the wave guide 16 to the output impedance of the magnetron 10. The other end of the wave guide 16 feeds the small end of a radiating horn 18. The horn 18 is tapered such that the small end of the horn is the same size as the rectangular cross-sectional area of the wave guide 16, while the large end of the horn 18 has a cross section which is substantially square.

The large end of horn 18 feeds directly into a heating cavity or oven 19, preferably at the bottom of the oven 19, with the large end of horn 18 covering the entire area of the bottom of the oven 19. In order to allow radiated energy to be coupled into the oven 19 from the horn 18 in any region of the bottom of oven 19, the entire floor of the oven is made of a material which is transparent to the radiated energy. Specifically, this floor is shown here in the form of a glass tray 21, which may be, for example, one of the standard heat resistant glasses, such as Pyrex. Tray 21 rests on brackets 22 attached to the walls of oven 19 at the lower edges thereof and is removable to facilitate cleaning thereof. As shown here, tray 21, in addition to the bottom, has three sides and is normally oriented in the oven, such that three sides are positioned against the back and two side walls of the oven while the edge of the tray having no side is positioned adjacent the front of the oven in which is a door 23, such that material spilled in tray 21 will run out at the front of the oven by the door 23 and will not interfere with the heating operation. If desired, however, the tray 21 may have four sides, thereby retaining any spillage therein until it is removed and cleaned.

The door 23 covers the entire front side of the oven 19, which is otherwise open. Thus the tray 21 may be easily slid in and out of the oven through door 23 sliding on brackets 22. The door 23 comprises a frame member 24 supporting a structure of grid wires 25 spaced sufficiently close together, for example, substantially less than one-half wave length of the operating frequency of magnetron 10, to prevent the coupling of energy therethrough. Frame 24 also has attached thereto a plurality of vertical bars 26 positioned adjacent the grid wires 25 on the outside thereof. The purpose of bars 26 is to prevent accidental contact of the grid wires 25 by the hands while reaching to open or close the door 23. The door 23 is adapted to slide open and closed on oven 19 and is supported on oven 19 by means of an extension 27 of the upper edge of door frame 24, which has a horizontal portion 28 positioned above a lip 29 welded on the front edge of oven 19 and extending out over door 23. Portion 28 has a plurality of studs 30 extending therethrough, threadedly adjustable therein, and locked by means of lock nuts 31. Studs 30 are of insulating material, such as nylon, and bear on a strip of insulating material 32 glued to the upper horizontal surface of lip 29. A vertical portion 33 of door frame extension 27 engages a vertical extension of lip 29, and a guide member 34 attached to the top of oven 19 extends over vertical extension 33, and the vertical extension lip 29 holding them in relatively close proximity such that the upper end of the door is permitted to move only by sliding sidewise with respect to oven 19, the weight of the door being carried by nylon studs 30 resting on the ceramic strip 32. An extension 35 of the lip 29 on the left-hand side of the oven supports the door through the nylon studs 30 when the door is open. A stop 36 welded to extension 35 limits the maximum open position of the door, while a vertically extending stop 37 welded to the portion of lip 29, which extends down along the right-hand edge of oven 19, prevents movement of the door to the right of its closed position. A downward extending lip 38 at the bottom of door frame 27 engages the outside of the horn 18 and is held in sliding engagement therewith by means of a guide member 39 secured to the horn member 18. This prevents the bottom of door 23 from swinging out away from the oven 19.

Extending outwardly from the front of the door is cover plate assembly 40 having an aperture therein exposing the grid wires 25 and bars 26 and having a handle 41 secured thereto. The cover plate assembly is to slidably engage a cabinet, not shown, which entirely surrounds the cooking apparatus illustrated herein, as well as other necessary components, such as power supplies, switches, fuses and timing circuits. It is to be clearly understood that the particular door illustrated herein, while particularly useful to the embodiment of the invention illustrated herein, is by way of example only, and other types of doors could be used, such as doors which are hinged or which do not have a grill work therein. In addition, the design and dimensioning of the lip extensions around the oven at the door, for the embodiment shown herein, is approximately a quarter wave long to produce a quarter wave length choke whereby energy is prevented from leaking out around the door. This choke structure could be eliminated, if so desired, or other configurations of chokes could be used.

Figure 5:
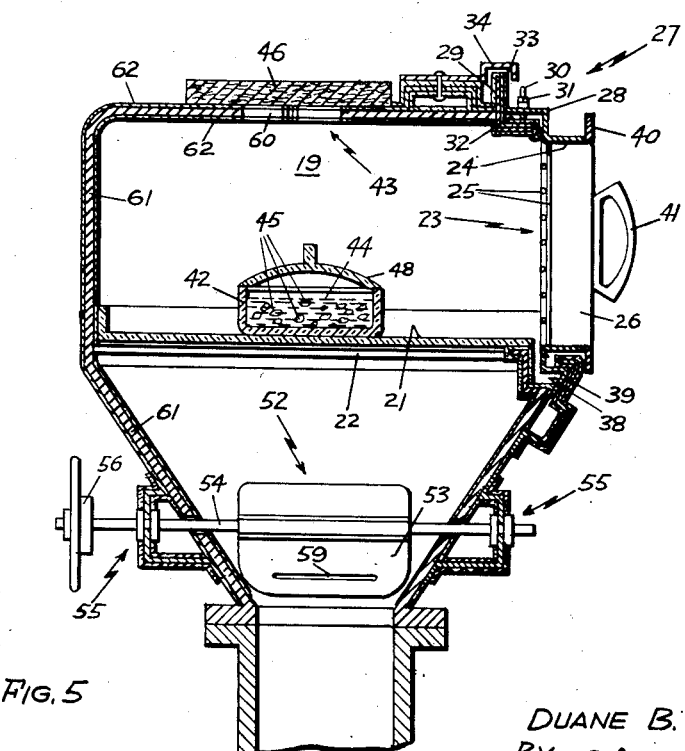
Fig. 5 illustrates a longitudinal cross-sectional view of the device shown in Fig. 1, taken along line 5—5 of Fig. 3.

The particular oven illustrated herein is particularly adapted for use with the food container shown in Figs. 1 and 5, which comprises a lower portion 42 which is in the shape of a bowl having relatively steep sides. Bowl 42 is made of ceramic and has a dielectric constant on the same order of magnitude as that of the Pyrex tray 21. For the embodiment shown herein, the Pyrex tray 21 has a thickness substantially less than a quarter wave length of the operating frequency of the magnetron 10, and, hence, due to the difference between the dielectric constant of the Pyrex glass, which is on the order of 6, and the dielectric constant of the air in the horn, presents an impedance discontinuity to the energy radiated from the horn 18. However, due to the matching effect of the horn 18 between the wave guide section 16 and the tray 21, over-all reflections from the tray 21 back to the magnetron 10, while present, are not excessive when no food container 42 is present in the oven 19.

Sufficient energy is coupled through the tray 21, diffused evenly throughout its area, to prevent damage to the magnetron 10 by heating or mode shifting. This energy is coupled out through an aperture 43 in the top of the oven 19. When the container 42 is positioned in the oven on the tray 21 with material to be heated positioned in container 42, a large amount of energy is coupled into the food body contained in container 42. As illustrated herein, the container 42 is filled with fluid 44, such as soup-containing lumps 45, which may be, for example, meat, vegetables, or other ingredients. It has been found that extremely good coupling of energy into the contents of container 42 may be achieved by making the combined thickness of the bottom of container 42 and the tray 21 substantially equal to a quarter wave length of the radiated energy passing therethrough. Also, the average dielectric constant of the bottom of the container and the tray 21, both of which are on the order of 6, is chosen to be substantially equal to the square root of the dielectric constant of the contents of the container 42 multiplied by the dielectric constant of free space. Thus, if the container and tray have dielectric constants ranging from 5 to 7, a good impedance match is obtained with most food bodies whose dielectric constants may range from 30 to 50 at the operating frequency of the device, which may be, for example, 2,200 megacycles per second. For this frequency, the total thickness of the tray 21 and bottom of the container 42 would be slightly less than one-half inch. In practice, a tray has been built which is two-tenths of an inch thick and a container 42 has been used with a bottom wall thickness of a quarter inch, giving a total thickness of tray and container bottom of .45 inch. Since there is such a good impedance match through the tray into the food body in comparison to the impedance match through the tray in other portions thereof, the major part of the energy radiated by horn 18 passes into the food body in the container 42 and is absorbed therein. As a result, a very small portion of the radiated energy is coupled out at the top of the oven through the aperture 43 when a food body to be heated is positioned in the oven, but substantially all the energy is coupled out through the aperture 43 when no body is positioned in the oven. If desired, a block of energy-absorbing material, such as transite 46, a combination of concrete and asbestos, may be positioned outside the aperture 43 to absorb radiated energy coupled therethrough from the oven 19, thereby preventing any substantial amount of energy from being radiated into the areas adjacent the cooking apparatus. It is to be clearly understood that the thickness and dielectric constants of the glass tray 21 and dish 42 are disclosed by way of example only, and that any desired thicknesses and dielectric constants could be used to produce the desired impedance matching effects.

The food container 42 has a handle 47 attached thereto, whereby the dish may be placed in the oven and removed therefrom. Since the dish 42 and handle 47 are made of relatively low loss material, substantially no energy is absorbed thereby during heating of the food body, and, consequently, the handle never becomes hot to the touch when heating the material in container 42. The container 42 may be removed from the oven 19 and served to the consumer as a bowl, such a soup bowl, and the food may be consumed directly therefrom. The sides of the container 42 are made relatively steep so that there are no thin edge portions of the food contents to become overheated by over-concentrations of radiant energy, as would be the case if a flat sloping-sided food container were used.

There is shown a cover 48 for container 42, cover 48 being made, for example, of glass, or of any other desired material which is transparent. Cover 48 retains, to a large degree, steam escaping from the surface of the food body being cooked and provides for observing the contents of the container 42, during the cooking process, through the gril work in the door 23, which is closed during the cooking process. The food being cooked may be illuminated during the cooking process by means of a light 49 mounted outside horn 18 on a bracket 50 and shining through a grill 51 covering an aperture in one wall of the horn 18. The spaces of grill 51 are substantially less than a half wave length of the operating frequency of the magnetron 10 to prevent loss of the radiant energy therethrough. The light shining through wall 51 from lamp 49 passes through tray 21, which is transparent, and through dish 42, which is translucent, or if desired, transparent, thereby illuminating the contents of dish 42 so that it may be viewed through the transparent top 48.

In order to produce uniform heating throughout the contents of dish 42, there is provided a mode-stirring structure 52 in horn 18 which varies the pattern of standing waves in the contents of dish 42. Specifically, mode stirrer 52 comprises a planar member 53 mounted on an insulating rod 54, for example, of nylon, the axis of said rod extending transverse to the axis of horn 18 and transverse to the electrostatic lines of the energy radiated into horn 18 from wave guide 16. Rod 54 extends out through apertures in the sides of horn 18 and is supported in bearings 55 outside horn 18. Plate 53 is rigidly attached to rod 54 such that when rod 54 is rotated by means of a pulley 56 secured to rod 54 outside horn 18 and driven by means of a belt 57 from a motor 58 mounted on the outside of horn 18, the plate 53 will rotate inside horn 18. The use of an insulating material for the rod 54 eliminates any danger of arcing at the points where rod 54 passes through horn 18 and the apertures in horn 18 through which rod 54 passes are substantially less than a half-wave length of the operating frequency of said device, whereby substantially no energy is coupled out of horn 18 through the said apertures.

Plate 53 is asymmetrically positioned on rod 54 with the larger side having an iris 59 therein. Iris 59 is in the form of a long slot whose longitudinal axis is oriented transverse to the electrostatic lines of energy radiated into horn 18 from wave guide 16 and whose length is on the order of a half-wave length of the operating frequency of magnetron 10. It has been found that the use of a mode stirrer rotating about an axis transverse to the direction of propagation of the radiated energy produces a thorough mode-stirring action. It has been further found that such a mode stirrer produces cyclically a relatively high standing wave ratio. However, the use of an iris coupling, such as 59, reduces this standing wave ratio to a tolerable value. In addition, it has been found that the use of a plurality of iris couplings of the slot type, for example, one on either side of the axis of rotation, creates conditions causing heating of the mode stirrer vane, while the use of only one iris 59 in an asymmetrical mode stirrer structure produces a device wherein substantially no heating occurs in the mode stirrer.

For best results, it is desirable that the heating oven have dimensions which are several wave lengths of the operating frequency of the device for optimum operation of the mode-stirring structure and that the height, width and depth of the oven be substantially different from each other. This dimensioning, in combination with the tapered walls of the horn 18, produces a structure wherein a great many different modes having overlapping resonant bands may be excited within the oven and horn structure. Thus the exact frequency of the source is not critical, since the oven structure may be energized in a substantially resonant mode by a relatively wide range of frequencies.

In order that the aperture 43 be operative to couple energy out of the cavity for any of the modes excited therein, aperture 43 is made in the form of a plurality of crossed slots, for example, three in number, as shown at 60, said slots being on the order of a half-wave length long at the operating frequency of said device, whereby each slot may act as a coupling iris for a mode wherein the electrostatic lines are substantially perpendicular to the slot.

In order to substantially eliminate arcing produced by concentrations of the radiated energy close to the walls of the oven 19 and horn 18, horn 18 and oven 19 are made of sheet metal, as at 61, having a coating of ceramic bonded to both sides thereof, as at 62. Coating 62 may be a conventional porcelainized coating, preferably having areas of light-reflecting material, such as white ceramic thereon. The light-reflecting areas may be, for example, patches of white porcelain fused into a darker background, or, if desired, the entire coating may be made of a light-colored porcelain, or other insulating material, such as plastic. The metal core 61 of the oven and horn may be ordinary sheet steel, thereby presenting some degee of loss to the radiated energy impinging thereon. This is also a contributing factor in preventing excessive reflection of energy to the magnetron 10 in the absence of a body to be heated being positioned in the oven, since, in the absence of a body to be heated, the intensity of the radiated field pattern builds up, producing higher currents in the oven and horn walls with an increase of absorption of energy thereby. On the other hand, when a body to be heated is positioned in the oven, the field intensity is lower, since the bulk of the energy is absorbed directly by the food body and a relatively small amount of energy is absorbed in the oven and the horn.

This completes the description of the particular embodiment of the invention illustrated herein. However, many modifications thereof will be apparent to persons skilled in the art without departing from the spirit and scope of this invention. For example, many different types of mode stirrers could be used in place of the mode stirrer illustrated herein, or, indeed, the mode stirrer could be eliminated altogether, or the mode stirring could be accomplished by cyclical frequency variation of the radiated energy. The impedance matching produced by the combined action of the tray 21 and dish 42 could be used without a covering oven 19, if so desired, any desired means for protecting the magnetron 10 against failure caused by excess reflection of energy to the magnetron could be used, such as relay devices controlled by the energy directionally coupled out of wave guide 16, and any desired safety interlock switch system could be used on door 23 to deenergize magnetron 10 when door 23 is opened. Accordingly, it is desired that this invention be not limited by the particular details of the embodiments disclosed herein, except as defined by the appended claims.

What is claimed is:

1. Electronic heating apparatus comprising an enclosure defining a cavity, means for radiating electromagnetic wave energy into said cavity from the bottom thereof, means for positioning a body to be heated in said cavity, a structure positioned adjacent said body for improving the impedance match between said body and said energy radiating means, said structure comprising a dielectric container for said body having a dielectric bottom and a dielectric support for said container, said container being permeable to light, and means for directing light through said container to illuminate the contents thereof.

2. Electronic heating apparatus comprising an enclosure defining a cavity, means for uniformly directing radiated electromagnetic wave energy into said cavity from the bottom thereof, said cavity being large with respect to a wave length of the frequency of said energy, means for positioning a body to be heated in said cavity, means for cyclically varying the intensity pattern of said energy impinging on said body comprising a planar member a symmetrically mounted on a shaft and rotatable about an axis transverse to the direction of propagation of energy into said cavity said planar member having a coupling slot in one portion thereof, a structure positioned between said body and said radiating means for improving the impedance match between said body and said energy radiating means, said structure comprising a container for said body having a dielectric bottom, and a dielectric support for said container, said container being adapted to cooperate with said support to couple a substantial portion of said energy directly into said body.

3. Electronic heating apparatus comprising an enclosure defining a cavity, means for radiating electromagnetic wave energy into said cavity from the bottom thereof, said cavity being large with respect to a wave length of the frequency of said energy, means for positioning a body to be heated in said cavity, means for cyclically varying the intensity pattern of said energy impinging on said body comprising conductive means rotatable about an axis transverse to the direction of propagation of energy into said cavity, a structure positioned adjacent said body for improving the impedance match between said body and said energy radiating means, said structure comprising a container for said body having a dielectric bottom and a dielectric support for said container, said container being permeable to light, a transparent cover for said container, and means for directing light through said container to illuminate the contents thereof.

4. Electronic heating apparatus comprising an enclosure defining a cavity, means for uniformly directing radiated electromagnetic wave energy into said cavity from the bottom thereof, support means transparent to said radiated energy and having a characteristic impedance substantially different from that of said directing means for positioning a body to be heated in said cavity, said support means being located intermediate the point at which said energy is introduced into said cavity and the remaining portions of said cavity whereby upon introduction into said cavity said energy substantially passes first through said support means before being distributed in the remaining portions of said cavity, and dielectric container means adapted to rest upon and physically constructed to cooperate with said support means to couple substantial amounts of said radiated energy through said support means substantially only in the area where said container means is resting whereby said energy so coupled goes directly into said body held in said container means.

5. Electronic heating apparatus comprising an enclosure defining a cavity, means for uniformly directing radiated high frequency electromagnetic wave energy into said cavity from the bottom thereof, means transparent to said radiated energy and having a characteristic impedance substantially different from that of said directing means for positioning a body to be heated in said cavity, said support means being located intermediate the point at which said energy is introduced into said cavity and the remaining portions of said cavity whereby upon introduction into said cavity said energy substantially passes first through said support means before being distributed in the remaining portions of said cavity, and dielectric container means adapted to rest upon and physically constructed to cooperate with said support means to couple substantial amounts of said radiated energy through said support means substantially only in the area where said container means is resting whereby said energy so coupled goes directly into said body held in said container means.

6. Electronic heating apparatus comprising an enclosure defining a cavity, means for uniformly directing radiated microwave energy into said cavity from the bottom thereof, means transparent to said radiated energy and having a characteristic impedance substantially different from that of said directing means for positioning a body to be heated in said cavity, said support means being located intermediate the point at which said energy is introduced into said cavity and the remaining portions of said cavity whereby upon introduction into said cavity said energy substantially passes first through said support means before being distributed in the remaining portions of said cavity, and dielectric container means adapted to rest upon and physically constructed to cooperate with said support means to couple substantial amounts of said radiated energy through said support means substantially only in the area where said container means is resting whereby said energy so coupled goes directly into said body held in said container means.

7. Electronic heating apparatus comprising an enclosure defining a cavity, means for uniformly directing radiated electromagnetic wave energy into said cavity from the bottom thereof, means for positioning a body to be heated in said cavity, said support means being located intermediate the point at which said energy is introduced into said cavity and the remaining portions of said cavity whereby upon introduction into said cavity said energy substantially passes first through said support means before being distributed in the remaining portions of said cavity, a plurality of crossed slots for coupling energy out of said cavity at the top thereof, and dielectric container means adapted to rest upon and physically constructed to cooperate with said support means to couple substantial amounts of said radiated energy through said support means substantially only in the area where said container means is resting whereby said energy so coupled goes directly into said body held in said container means.

8. Electronic heating apparatus comprising an enclosure defining a cavity, means for uniformly directing radiated electromagnetic wave energy into said cavity from the bottom thereof, means for cyclically varying the mode pattern in said cavity, means transparent to said radiated energy and having a characteristic impedance substantially different from that of said directing means for positioning a body to be heated in said cavity, said support means being located intermediate the point at which said energy is introduced into said cavity and the remaining portions of said cavity whereby upon introduction into said cavity said energy substantially passes first through said support means before being distributed in the remaining portions of said cavity, and dielectric container means adapted to rest upon and physically constructed to cooperate with said support means to couple substantial amounts of said radiated energy through said support means substantially only in the area where said container means is resting whereby said energy so coupled goes directly into said body held in said container means.

9. Electronic heating apparatus comprising a source of electromagnetic wave energy, means for concentrating and directing said energy toward a body to be heated, a structure positioned between said body and said source for improving the impedance match between said body and said source, said structure comprising a dielectric container for said body, and a dielectric support for said container, said support means being located intermediate the point at which said energy is introduced into said cavity and the remaining portions of said cavity whereby upon introduction into said cavity said energy substantially passes first through said support means before being distributed in the remaining portions of said cavity, said dielectric container means being adapted to rest upon and physically constructed to cooperate with said support means to couple substantial amounts of said radiated energy through said support means substantially only in the area where said container means is resting whereby said energy so coupled goes directly into said body held in said container means.

10. Electron heating apparatus comprising an enclosure defining a cavity, means for uniformly directing radiated electromagnetic wave energy into said cavity from the bottom thereof, said cavity being large with respect to a wavelength of the frequency of said energy, means transparent to said radiated energy and having a characteristic impedance substantially different from that of said directing means for positioning a body to be heated in said cavity, said support means being located intermediate the point at which said energy is introduced into said cavity and the remaining portions of said cavity whereby upon introduction into said cavity said energy substantially passes first through said support means before being distributed in the remaining portions of said cavity, and dielectric container means adapted to rest upon and physically constructed to cooperate with said support means to couple substantial amounts of said radiated energy through said support means substantially only in the area where said container means is resting whereby said energy so coupled goes directly into said body held in said container means.

11. Electronic heating apparatus comprising an enclosure defining a cavity, means for uniformly directing radiated electromagnetic wave energy into said cavity from the bottom thereof, means for positioning a body to be heated in said cavity, a structure positioned between said body and said radiating means for improving the impedance match between said body and said energy radiating means, said structure comprising a container for said body having a dielectric bottom, and a dielectric support for said container, said support means being located intermediate the point at which said energy is introduced into said cavity and the remaining portions of said cavity whereby upon introduction into said cavity said energy substantially passes first through said support means before being distributed in the remaining portions of said cavity, said dielectric container means being adapted to rest upon said support means, the bottom thickness of said container being of a value with respect to the thickness of said support means such that substantial amounts of said radiated energy are coupled through said support means substantially only in the area where said container means is resting whereby said energy so coupled goes directly into said body held in said container means.

12. Electronic heating apparatus comprising an enclosure defining a cavity, means for uniformly directing radiated electromagnetic wave energy into said cavity from the bottom thereof, said cavity being large with respect to a wave length of the frequency of said energy, means for positioning a body to be heated in said cavity, a structure positioned between said body and said radiating means for improving the impedance match between said body and said energy radiating means, said structure comprising a container for said body having a dielectric bottom, and a dielectric support for said container, said support means being located intermediate the point at which said energy is introduced into said cavity and the remaining portions of said cavity whereby upon introduction into said cavity said energy substantially passes first through said support means before being distributed in the remaining portions of said cavity, said dielectric container means being adapted to rest upon said support means, the bottom thickness of said container being of a value with respect to the thickness of said support means such that substantial amounts of said radiated energy are coupled through said support means substantially only in the area where said container means is resting whereby said energy so coupled goes directly into said body held in said container means.

13. Electronic heating apparatus comprising an enclosure defining a cavity, means for uniformly directing radiated electromagnetic wave energy into said cavity from the bottom thereof, means for cyclically varying the mode pattern in said cavity comprising a planar member asymmetrically mounted on a shaft and rotatable about an axis transverse to the direction of propagation of energy into said cavity, said planar member having a coupling slot in one portion thereof, means transparent to said radiated energy and having a characteristic impedance substantially different from that of said directing means for positioning a body to be heated in said cavity, said support means being located intermediate the point at which said energy is introduced into said cavity and the remaining portions of said cavity whereby upon introduction into said cavity said energy substantially passes first through said support means before being distributed in the remaining portions of said cavity, and dielectric container means adapted to rest upon and physically constructed to cooperate with said support means to couple substantial amounts of said radiated energy through said support means substantially only in the area where said container means is resting whereby said energy so coupled goes directly into said body held in said container means.

References Cited in the file of this patent

UNITED STATES PATENTS

| Number | Name | Date |
|---|---|---|
| 2,133,184 | Burrow | Oct. 11, 1938 |
| 2,467,230 | Revercomb et al. | Apr. 12, 1949 |
| 2,495,170 | Kinn | Jan. 17, 1950 |
| 2,497,670 | Hanson et al. | Feb. 14, 1950 |
| 2,500,752 | Hanson et al. | Mar. 14, 1950 |
| 2,526,226 | Gross | Oct. 17, 1950 |
| 2,585,970 | Shaw | Feb. 19, 1952 |
| 2,612,596 | Gross | Sept. 30, 1952 |
| 2,618,735 | Hall | Nov. 18, 1952 |
| 2,622,187 | Welch | Dec. 16, 1952 |
| 2,632,090 | Revercomb et al. | Mar. 17, 1953 |
| 2,714,070 | Welch | July 26, 1955 |
| 2,716,694 | Schroeder | Aug. 30, 1955 |
| 2,748,239 | Long et al. | May 29, 1956 |
| 2,762,893 | Long et al. | Sept. 11, 1956 |